United States Patent
Agari et al.

(10) Patent No.: US 11,157,666 B2
(45) Date of Patent: Oct. 26, 2021

(54) VEHICLE TRAVELING SIMULATION SYSTEM, VEHICLE TRAVELING SIMULATION METHOD AND ACTIVATION DEVICE

(71) Applicant: TOYOTA JIDOSHA KABUSHIKI KAISHA, Toyota (JP)

(72) Inventors: Takashi Agari, Toyota (JP); Youichi Suzuki, Toyota (JP); Atsushi Watanabe, Nisshin (JP); Kentaro Kawano, Toyota (JP); Ryosuke Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 15/929,199

(22) Filed: Jan. 3, 2020

(65) Prior Publication Data

US 2020/0233992 A1     Jul. 23, 2020

(30) Foreign Application Priority Data

Jan. 23, 2019   (JP) .............................. JP2019-009569

(51) Int. Cl.
*G06F 30/20*     (2020.01)

(52) U.S. Cl.
CPC ................... *G06F 30/20* (2020.01)

(58) Field of Classification Search
CPC ................... G06F 30/15; G06F 30/20
See application file for complete search history.

(56) References Cited

U.S. PATENT DOCUMENTS 10,559,217 B2 *   2/2020   Alvarez ................ G06F 30/15

FOREIGN PATENT DOCUMENTS

| JP | 2017-117193 | A | 6/2017 | |
| JP | 2017117193 | * | 6/2017 | ............ B60S 5/00 |

\* cited by examiner

*Primary Examiner* — Regis J Betsch
*Assistant Examiner* — Kaleria Knox
(74) *Attorney, Agent, or Firm* — Oblon, McClelland, Maier & Neustadt, L.L.P.

(57) ABSTRACT

In a vehicle traveling simulation system, a multimedia device has at least a test target function among in-vehicle media functions. An activation device activates the multimedia device. A plurality of external terminal devices is respectively provided at different positions from the multimedia device. A data acquisition unit of the activation device is able to acquire vehicle state data simulating a vehicle state when a vehicle is traveling from the plurality of external terminal devices. An input unit inputs, to the multimedia device, activation data corresponding to the vehicle state data. The multimedia device is activated based on the input activation data.

7 Claims, 3 Drawing Sheets

US 11,157,666 B2

VEHICLE TRAVELING SIMULATION SYSTEM, VEHICLE TRAVELING SIMULATION METHOD AND ACTIVATION DEVICE

INCORPORATION BY REFERENCE

The disclosure of Japanese Patent Application No. 2019-009569 filed on Jan. 23, 2019 including the specification, drawings and abstract is incorporated herein by reference in its entirety.

BACKGROUND

1. Technical Field

The present disclosure relates to a vehicle traveling simulation system and a vehicle traveling simulation method, for testing an in-vehicle multimedia device.

2. Description of Related Art

Japanese Unexamined Patent application Publication No. 2017-117193 (JP 2017-117193 A) discloses a vehicle information management system including an in-vehicle electronic control unit that detects diagnostic information of a vehicle, and a data server that receives and stores the diagnostic information from the electronic control unit. The data server creates analysis information based on the stored diagnostic information and sends feedback the analysis information to a system user. The vehicle diagnostic information is acquired by traveling of the vehicle.

SUMMARY

In the technology disclosed in JP 2017-117193 A, causes of vehicle malfunction is identified based on the diagnostic information acquired by traveling of the vehicle, however it is costly to acquire the diagnostic information by actually driving the vehicle for testing the in-vehicle multimedia device. For example, upon testing the operation when the multimedia device of the vehicle receives foreign infrastructure information, it is too expensive to actually drive the vehicle in a foreign country.

The present disclosure provides, considering such circumstances stated above, a technology for testing an in-vehicle multimedia device at a low cost.

In order to solve the above issue, a vehicle traveling simulation system according to one aspect of the present disclosure includes a multimedia device having at least a test target function among in-vehicle media functions, an activation device for activating the multimedia device, and a plurality of external terminal devices, each of which is provided at a different position from the multimedia device. The activation device includes a data acquisition unit configured to be able to acquire vehicle state data simulating a vehicle state when a vehicle is traveling from the plurality of external terminal devices, and an input unit configured to input to the multimedia device activation data corresponding to the vehicle state data. The multimedia device is activated based on the input activation data.

Another aspect of the present disclosure is a vehicle traveling simulation method. This method is a vehicle traveling simulation method executed by a multimedia device having at least a test target function among in-vehicle media functions, an activation device for activating the multimedia device, and a plurality of external terminal devices, each of which is provided at a different position from the multimedia device. The method includes a step of acquiring, by the activation device, vehicle state data simulating a vehicle state when a vehicle is traveling from the plurality of external terminal devices, a step of inputting, by the activation device, to the multimedia device activation data corresponding to the vehicle state data, and a step of activating, by the activation device, the multimedia device based on the input activation data.

Still another aspect of the present disclosure is an activation device. This device is an activation device for activating a multimedia device having at least a test target function among in-vehicle media functions, which includes a data acquisition unit configured to be able to acquire vehicle state data simulating a vehicle state when a vehicle is traveling from a plurality of external terminal devices, each of which is provided at a different position from the multimedia device, and an input unit configured to input to the multimedia device activation data corresponding to the vehicle state data such that the multimedia device is activated in response to the vehicle state data.

According to the present disclosure, it is possible to provide a technology capable of testing the in-vehicle multimedia device at a low cost.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
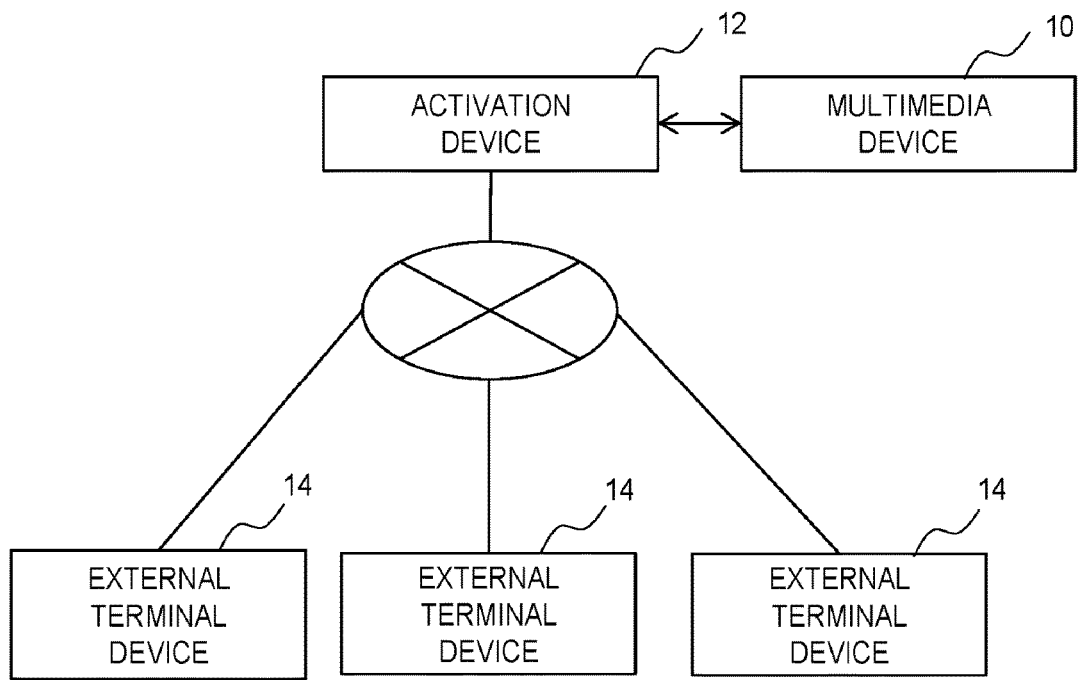
FIG. 1 is a diagram describing a configuration of a vehicle traveling simulation system.

FIG. 1 is a diagram describing a configuration of a vehicle traveling simulation system 1. The vehicle traveling simulation system 1 includes a multimedia device 10 for a vehicle, an activation device 12 that activates the multimedia device 10, and a plurality of external terminal devices 14, each of which can be connected to the activation device 12 via a network. The multimedia device 10 and the activation device 12 are in a laboratory, and the external terminal device 14 is in a remote location away from the laboratory.

The vehicle traveling simulation system 1 simulates the operation of the multimedia device 10 when the vehicle is traveling, and is a system capable of executing simulation from the external terminal device 14 located far away from the multimedia device 10.

The multimedia device 10 can execute a plurality of media functions, such as audio function, navigation function, video playback function, and traffic information notification, and outputs information to an occupant from an output unit such as an in-vehicle display, a speaker, and an alarm. The media function outputs at least one of character data, image data, and audio data. The multimedia device 10 acquires a plurality of types of vehicle information, and outputs an output result based on the vehicle information by the output unit. The vehicle information includes information acquired by in-vehicle devices, such as audio data, sound data acquired by a microphone, camera images, and detected information acquired by an in-vehicle sensor, and information acquired from external device, such as radio data, telephone data, global positioning system (GPS) information, operation data acquired by the occupant, electronic toll collection system (ETC) information, and beacon information. The GPS information and the detected information of the in-vehicle sensor are vehicle state data, such as location information and traveling state information when the vehicle is traveling, the beacon information and the ETC information are traffic information, and the radio data and the telephone data are infrastructure information.

The multimedia device 10 is a prototype device which will be mounted on the vehicle, and has at least a test target function among the in-vehicle media functions. In addition, the multimedia device 10 may be in a state of being mounted on a vehicle, but may be in a state before being mounted on the vehicle.

The external terminal device 14 is provided at a remote location different from a location of the multimedia device 10, causes the activation device 12 to input vehicle information when the vehicle is traveling to the multimedia device 10 placed in the laboratory and evaluates whether a desired output can be obtained or not. The activation device 12 is connected to the multimedia device 10 and inputs the vehicle information when the vehicle is traveling in accordance with an instruction from the external terminal device 14 to activate the multimedia device 10 so that a traveling state can be reproduced even if the vehicle does not travel. The activation device 12 converts, for example, in-vehicle sensor information received from the external terminal device 14 into a signal output from the actual in-vehicle sensor, and inputs the signal to the multimedia device 10.

Figure 2:
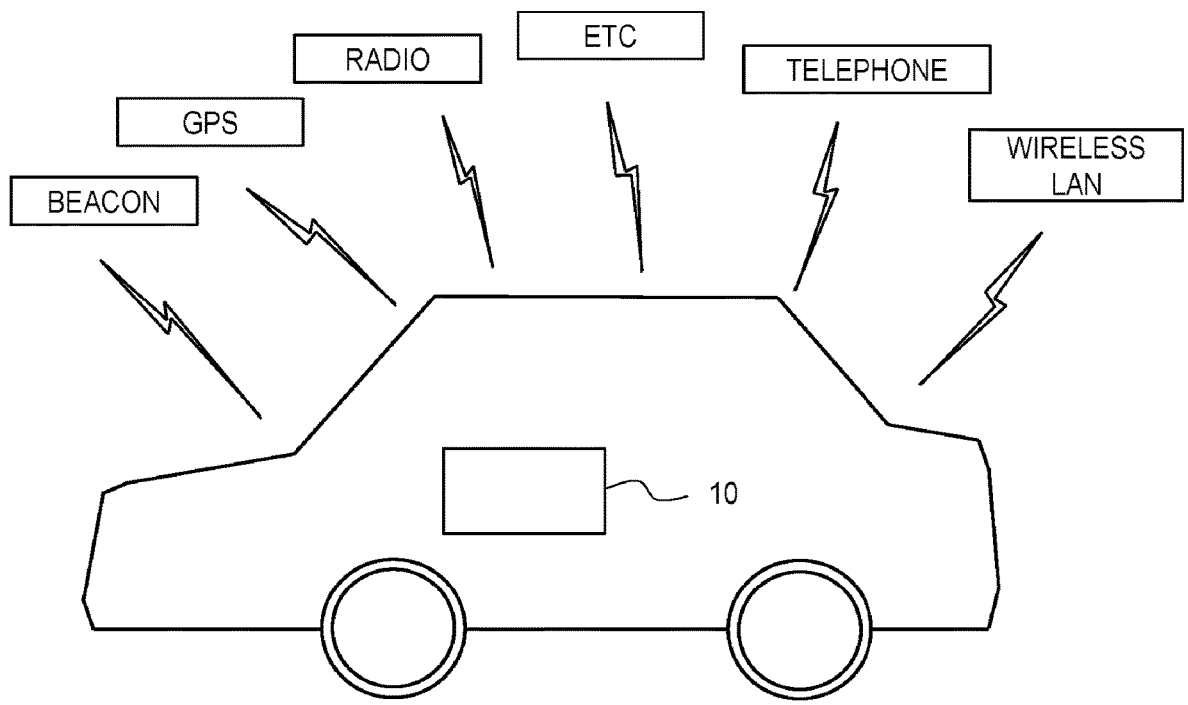
FIG. 2 is a diagram describing vehicle information input to a multimedia device when a vehicle is traveling.

FIG. 2 is a diagram describing the vehicle information input to the multimedia device 10 when the vehicle is traveling. When the vehicle is traveling, the vehicle information input to the multimedia device 10 includes beacon information output from a beacon installed on a road, GPS information acquired from a GPS satellite, radio information acquired from a base station, telephone information, wireless LAN information and the like, each of which is input from an external device. Beacon vehicle information and ETC vehicle information are traffic information output from the external device.

Various functions of the multimedia device 10 are executed individually, and after verifying that each function is activated normally and independently, the multimedia device 10 is tested by combining those functions. Since the multimedia device 10 uses various functions simultaneously, for example, traffic information interrupt notification and telephone communication, while the navigation function is executed, a test for an individual function only is not sufficient. In order to perform the test for executing a plurality of functions of the multimedia device 10 in combination, input which can be acquired when the vehicle is actually traveling, for example, from the beacon or GPS, is required.

Among vehicle information, radio broadcasting, for example, includes several types, such as analog broadcasting, digital broadcasting, and satellite broadcasting, different depending on the country while a transmission mode of infrastructure information and traffic information may also differ depending on the country. It is too costly to actually drive the vehicle in each country in order to test the operation when such information is input. Further, since a large number of the prototype cannot be made, it takes time and cost to send the prototype to each country for testing.

In the vehicle traveling simulation system 1 according to the embodiment, the test is executed by reproducing the activation of the multimedia device 10 when the vehicle is actually traveling, without driving the actual vehicle. The plurality of external terminal devices 14 can execute the test at a remote location from a location of the multimedia device 10, thus it is possible to input infrastructure information and traffic information of each country to the multimedia device 10. Further, the vehicle traveling simulation system 1 shares the infrastructure information and traffic information acquired by each external terminal device 14 and uses such information in the simulation, thus it is possible to simulate a state in which the vehicle is traveling on a road in another country.

Figure 3:
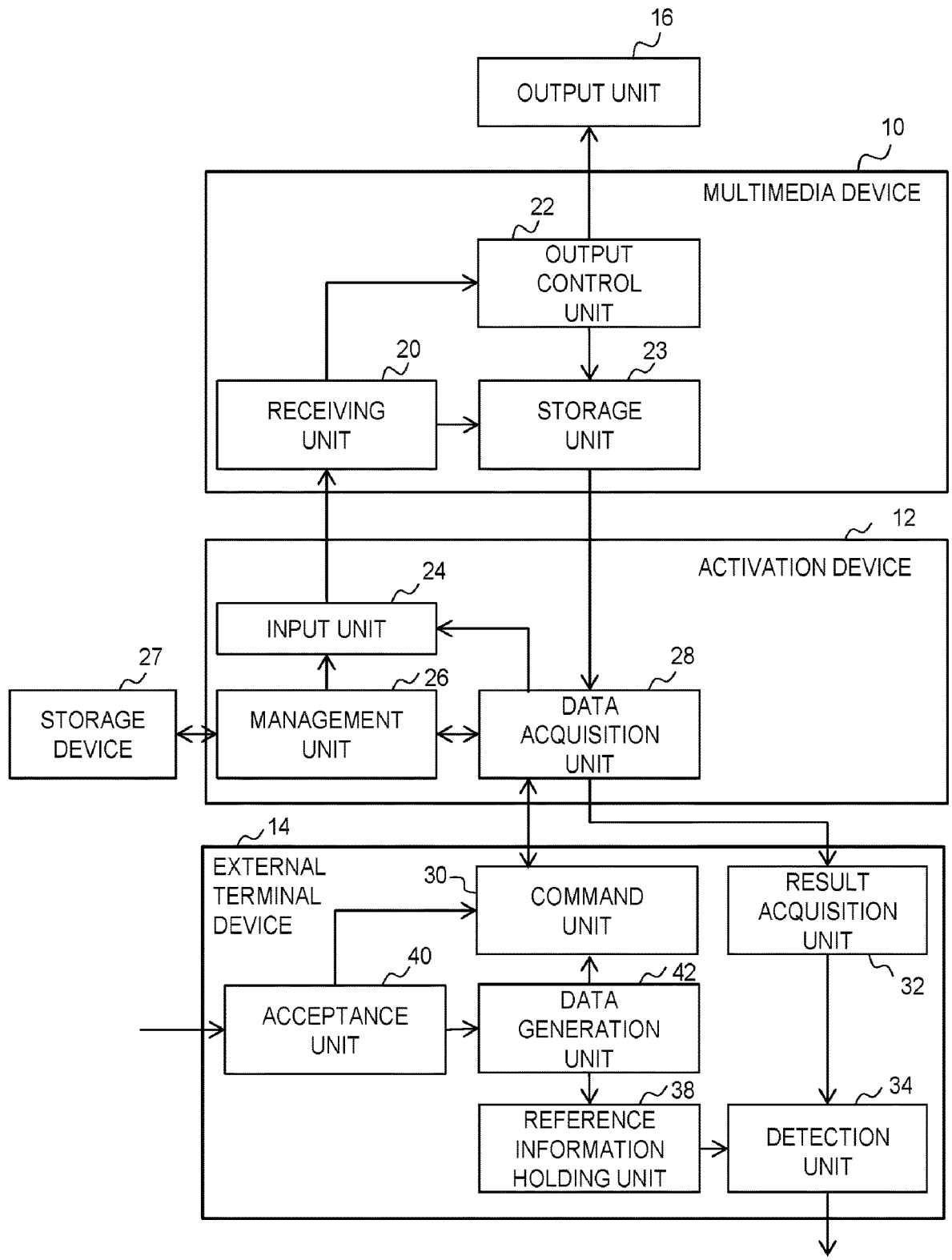
FIG. 3 is a diagram describing a functional configuration of the vehicle traveling simulation system.

FIG. 3 is a diagram describing a functional configuration of the vehicle traveling simulation system 1. In FIG. 3, each component stated as a functional block for performing various processing can be constituted with a circuit block, a memory, and other LSIs in terms of hardware, or, implemented by a program loaded into the memory, and the like in terms of software. Therefore, it will be apparent to those skilled in the art that those functional blocks can be implemented in various forms by hardware only, software only, or a combination thereof, but is not limited to anyone.

The multimedia device 10 includes a receiving unit 20, an output control unit 22, and a storage unit 23. The activation device 12 includes an input unit 24, a management unit 26, and a data acquisition unit 28. The external terminal device 14 includes a command unit 30, a result acquisition unit 32, a detection unit 34, a reference information holding unit 38, an acceptance unit 40, and a data generation unit 42.

The receiving unit 20 of the multimedia device 10 receives, from the activation device 12, activation data corresponding to simulation input data including the vehicle state data that reproduces the vehicle traveling on a predetermined road. The simulation input data is acquired by setting the vehicle information along a time axis, which is processed by the external terminal device 14. The activation data is the input data and is converted into a signal that can be used by the multimedia device 10. The activation data may be the same as the input data.

The output control unit 22 controls the output unit 16 to execute various media functions simultaneously based on the simulation input data. For example, the output control unit 22 receives the GPS information and displays an image showing a location of the host vehicle on a display of the output unit 16, receives a captured image from a camera and displays the surrounding environment of the vehicle on the display, receives the radio information and outputs radio voice from a speaker, receives the traffic information such as congestion information by the beacon and displays the interrupt notification on the display, receives information of a clearance sonar and a vehicle speed sensor and outputs an alarm notifying the possibility of obstacle collision. The output control unit 22 can turn on or off each media function for each simulation in accordance with a command from the external terminal device 14.

When the simulation input data is input to the receiving unit 20, the output control unit 22 turns off input via the actual input path, such as the in-vehicle sensor and the GPS function. The multimedia device 10 is not equipped with the in-vehicle sensor, such as a vehicle speed sensor and an acceleration sensor. However, if the input via the actual input path is not turned off, an input indicating that a sensor value is zero may be made to overwrite the simulation input data. The output control unit 22 turns off the input via the actual input path, such as the in-vehicle sensor and the GPS function, upon simulation, so that the simulation data and the actual sensor value are prevented from being input to the multimedia device 10 twice.

The storage unit 23 stores the vehicle information input to the receiving unit 20 and the output result, such as images and sounds, output from the output unit 16, in association with time. That is, the storage unit 23 stores the input data used for input to the multimedia device 10 and the output data from the multimedia device 10 in time series. The storage unit 23 may store the input data and the output data as diagnostic information using a diagnostic function for storing a vehicle state. Further, the storage unit 23 may also store the infrastructure information and the traffic information as the diagnostic information. The information stored in the storage unit 23 is transmitted to the external terminal device 14 via the activation device 12 in order to evaluate each function of the multimedia device 10.

The data acquisition unit 28 of the activation device 12 acquires the simulation input data input to the multimedia device 10 from the command unit 30 of the external terminal device 14. The data acquisition unit 28 acquires the simulation input data that simulates a vehicle state when the vehicle is traveling from any of the several external terminal devices 14 for each simulation.

Further, the data acquisition unit 28 acquires the output data of the multimedia device 10 from the storage unit 23 of the multimedia device 10 and transmits the data to the result acquisition unit 32 of the external terminal device 14.

The management unit 26 stores the simulation input data used for input to the multimedia device 10 in the storage device 27 so that any of several items of the vehicle information contained in the input data can be used again as requested by the external terminal device 14. For example, the management unit 26 can extract the infrastructure information of other countries used in the previous simulation, and the plurality of external terminal devices 14 can share and use the input data stored in the storage device 27. The storage device 27 may be provided in the laboratory where the activation device 12 is installed, or may be provided in an external server as cloud data.

The input unit 24 converts the simulation input data into the activation data, which is transmitted and received via controller area network (CAN) communication, and inputs the activation data to the multimedia device 10 in accordance with the time axis set in the input data. The activation data is a signal which is an available format of the input data in the multimedia device 10. Accordingly, the location information and the traffic information when the vehicle is traveling are input, so that the multimedia device 10 shows behaviors of the vehicle traveling state, and thus the location of the vehicle or the traffic information is displayed on the display of the multimedia device 10.

The input unit 24 can set for each test whether each of the plurality of media functions, that can be executed by the multimedia device 10, is activated or not in response to the command from the command unit 30 of the external terminal device 14. That is, among the plurality of media functions, the multimedia device 10 can be activated by turning on the test target function and turning off other functions that are not the test target. For example, in a case where the multimedia device 10 can execute analog broadcasting, digital broadcasting, and satellite broadcasting as the radio function, the input unit 24 is able to turn off the radio functions for analog broadcasting and satellite broadcasting that are not the test targets and to turn on digital broadcasting which is the test target. Accordingly, by setting whether the test target function is turned on or off, for example, the functions that are not used in specific countries can be excluded from the test target.

The input unit 24 may add the previous input data stored in the storage device 27 to the input data in response to the command from the command unit 30 of the external terminal device 14. For example, the input unit 24 may transmit the radio information, which is one of items included in the previous input data stored in the storage device 27, to the receiving unit 20 in addition to the input data acquired from the command unit 30.

The acceptance unit 40 of the external terminal device 14 accepts the information related to generation of the simulation input data, as an input from a user. For example, the acceptance unit 40 accepts an instruction to generate the simulation input data from the user, and accepts the information indicating whether the media function is turned on or off. Accordingly, it is possible to set whether each of the plurality of media functions executable by the multimedia device 10 is activated or not for each simulation, and thus the media function which is a simulation target can be set. The acceptance unit 40 transmits the accepted user input to the command unit 30 and the data generation unit 42.

Further, the acceptance unit 40 accepts the vehicle information for generating the simulation input data. The vehicle information for generating the simulation input data is information input to the multimedia device when the vehicle is actually traveling on the predetermined road and stored therein as the diagnostic information, and is traveling data indicating the vehicle state along the time axis. The vehicle information when the vehicle is actually traveling on the predetermined road is not limited to the information indicating the traveling state detected by the in-vehicle sensor, but also includes the traffic information and the infrastructure information received from the external device, and the hardware operation information by the occupant.

The data generation unit 42 generates the input data to be input to the multimedia device 10 and to simulate a state when the vehicle is traveling by processing the vehicle information when the vehicle is actually traveling on the predetermined road. That is, the data generation unit 42 processes the vehicle information when the vehicle is actually traveling as operated by the acceptance unit 40. The generated input data is continuous in time and simulates the vehicle state while traveling.

Although it is possible to input the actual vehicle information without processing to the multimedia device 10, the actual vehicle information is acquired from the vehicle traveling normally, and the input that reproduces, for example, excessive loads or abnormal values is not included. Therefore, it may be difficult to perform a desired test. Accordingly, the data generation unit 42 processes the actual vehicle information to implement the desired test.

As an example of processing the input data, the data generation unit 42 sets a value of the in-vehicle sensor to an abnormal value at a predetermined timing in order to test whether a predetermined alarm is output. Further, the data generation unit 42 sets a timing of traffic information generated on the time axis of the input data, and then shifts the generation timing of the traffic information, or adds the traffic information to the input data. Since the traffic information input to the multimedia device 10 is input as the interrupt, an excessive load is expected out of the vehicle information. By generating the traffic information inputs within a short interval, the excessive load is applied on the multimedia device 10 and thus it is possible to test the operation under high load conditions. The data generation unit 42 changes a size or a generation timing of the vehicle information extracted from the vehicle diagnostic information to generate the input data, and creates a state that is unlikely to occur during normal traveling, thereby implementing a desired simulation.

The data generation unit 42 generates the input data by interrupting the traffic information in accordance with a load mode set by the user. For example, the user can set the load mode to any one of a high load state, a medium load state, and a low load state. The data generation unit 42 receives the load mode set by the user from the acceptance unit 40, and the traffic information with the occurrence frequency or data amount corresponding to the load mode is interrupted. By automatically incorporating the traffic information into the input data according to the load mode set by the user, it is possible to save effort of a user and easily create the simulation input data.

The data generation unit 42 extracts any one of the various items of the vehicle information to generate the input data. For example, the data generation unit 42 can extract necessary sensor values only from the traveling data and discard unnecessary vehicle information, thereby increasing the degree of freedom of simulation.

The data generation unit 42 may receive the vehicle information used in other simulations via the management unit 26 of the activation device 12 and use such information for processing. For example, the data generation unit 42 may acquire radio data for satellite digital broadcasting in another country and add such data to the input data. The plurality of external terminal devices 14 can share the simulation input data.

The data generation unit 42 acquires a series of display images on the display when the vehicle is actually traveling, and generates the evaluation data for evaluating whether or not there is a malfunction in the output of the multimedia device 10 during simulation. The data generation unit 42 receives the actual travel data from the acceptance unit 40 and the output of the multimedia device 10 when the travelling data is acquired, processes the actual travel data into the input data, and processes the output of the multimedia device into the evaluation data. The evaluation data is a display image and a sound signal in time series order. For example, when the data generation unit 42 is set to change the generation timing of the traffic information included in the traveling data, the data generation unit 42 changes the display image so as to change the timing for displaying the interrupt notification based on the traffic information on the display. Moreover, the data generation unit 42 generates the evaluation data so that a warning may be output at the timing, when the input data of the in-vehicle sensor is set to have an abnormal value. The reference information holding unit 38 holds the evaluation data generated by the data generation unit 42.

The command unit 30 transmits the generated simulation input data to the data acquisition unit 28 of the activation device 12 and instructs the multimedia device 10 to be activated with the input data. In addition to the input data, the command unit 30 transmits information instructing to turn on or off the media function to the data acquisition unit 28. Accordingly, it is possible to set whether the various media functions executable by the multimedia device 10 is activated or not for each test.

The result acquisition unit 32 acquires the output data stored as the diagnostic information in the storage unit 23 of the multimedia device 10. That is, the result acquisition unit 32 acquires the output result of the multimedia device 10 when the simulation is executed. The output data includes a series of images displayed on the display of the output unit 16 and a sound output from the speaker of the output unit 16. Accordingly, a malfunction can be detected on a side of the external terminal device 14.

The detection unit 34 detects a malfunction in the output result by comparing the output result of the multimedia device 10 when the simulation is executed with the evaluation data held in advance. The detection unit 34 determines whether the display image included in the output data matches the display image included in the evaluation data by a degree that is equal to or greater than a predetermined reference value. If it does not match, there is a malfunction, otherwise, there is no malfunction. The detection result of the detection unit 34 is displayed on the display or the like. For example, the detection unit 34 determines whether or not the interrupt notification is normally displayed on the display when the traffic information is input using the beacon. Accordingly, a malfunction can be detected automatically.

Figure 4:
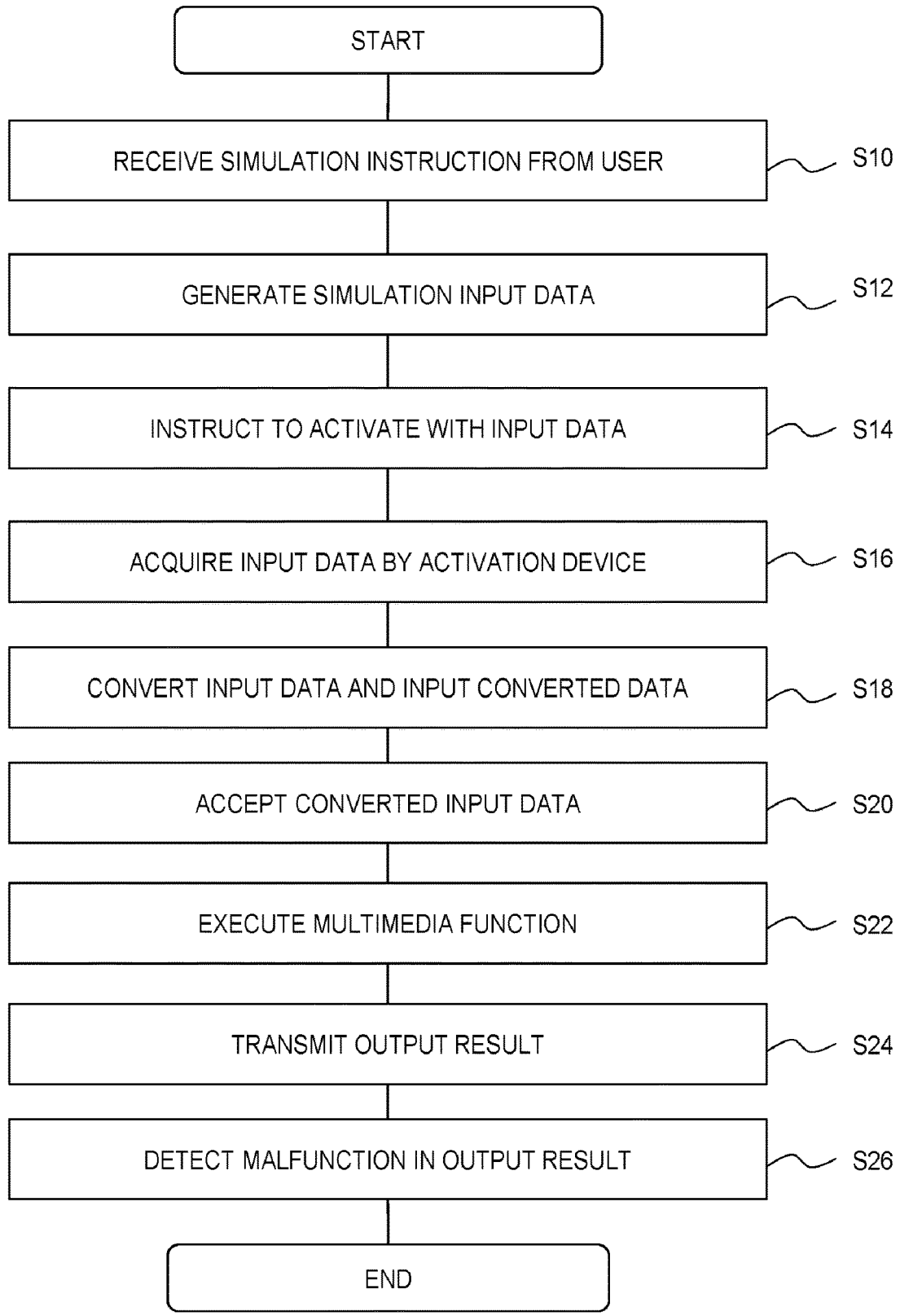
FIG. 4 is a flowchart of a vehicle traveling simulation processing.

FIG. 4 is a flowchart of the vehicle traveling simulation processing. The acceptance unit 40 accepts the information related to generation of the simulation input data, as the input from the user (S10). The data generation unit 42 generates the input data to be input to the multimedia device 10 and to simulate a state when the vehicle is traveling by processing the traveling data when the vehicle is actually traveling on the predetermined road (S12). The command unit 30 transmits the generated simulation input data to the data acquisition unit 28 of the activation device 12 and instructs the multimedia device 10 to be activated based on the input data (S14).

The data acquisition unit 28 of the activation device 12 acquires the simulation input data input to the multimedia device 10 from the command unit 30 of the external terminal device 14 (S16). The input unit 24 converts the simulation input data into the activation data and inputs the activation data to the multimedia device 10 (S18).

The receiving unit 20 of the multimedia device 10 receives activation data that reproduces the vehicle traveling on a predetermined road from the activation device 12 (S20). The output control unit 22 controls the output unit 16 to execute various media functions simultaneously based on the simulation activation data (S22).

The storage unit 23 stores the vehicle information input to the receiving unit 20 and the output result, such as images and sounds, output from the output unit 16, in association with time, and outputs the vehicle information to the external terminal device 14 via the activation device 12 (S24). The detection unit 34 detects a malfunction in the output result by comparing the output result of the multimedia device 10 when the simulation is executed with the evaluation data held in advance (S26). The user operating the external terminal device 14 can execute the test of the multimedia device 10 from a remote location.

It will be apparent to those skilled in the art that the embodiments are merely examples, and that various modifications can be made to the combination of each component, and that such modifications are also within the scope of the present disclosure.

In the present embodiment, the detection unit 34 detects a malfunction in the output result of the multimedia device 10. However, the present disclosure is not limited to such an embodiment. For example, the result acquisition unit 32 may output the output result of the multimedia device 10 to the user through the display and the speaker, and the user may detect a defect.

What is claimed is:

1. A vehicle traveling simulation system, comprising:
a multimedia device having at least a test target function selected from in-vehicle media functions;
an activation device configured to activate the multimedia device; and
a plurality of external terminal devices, each of which is provided at a different position from the multimedia device, wherein:
the activation device includes:
a data acquisition unit configured to acquire vehicle state data simulating a vehicle state when a vehicle is traveling from the plurality of external terminal devices; and
an input unit configured to input, to the multimedia device, activation data corresponding to the vehicle state data, and
the multimedia device is activated based on the input activation data.

2. The vehicle traveling simulation system according to claim 1, wherein the activation device further includes a management unit configured to store the vehicle state data used for input to the multimedia device in a storage device and allow the vehicle state data to be used again.

3. The vehicle traveling simulation system according to claim 1, wherein the activation device is configured to set, for each test, whether each of a plurality of functions executable by the multimedia device is activated or not.

4. The vehicle traveling simulation system according to claim 1, wherein the activation device is configured to transmit an output result of the multimedia device to an external terminal device that transmits the vehicle state data for test, among the plurality of external terminal devices.

5. The vehicle traveling simulation system according to claim 4, wherein the external terminal device includes a detection unit configured to detect a malfunction in the output result by comparing the output result with evaluation data stored in advance.

6. A vehicle traveling simulation method executed by a multimedia device having at least a test target function selected from in vehicle media functions, an activation device configured to activate the multimedia device, and a plurality of external terminal devices, each of which is provided at a different position from the multimedia device, the vehicle traveling simulation method comprising:
acquiring, by the activation device, vehicle state data simulating a vehicle state when a vehicle is traveling from the plurality of external terminal devices;
inputting, by the activation device, to the multimedia device, activation data corresponding to the vehicle state data; and
activating, by the activation device, the multimedia device based on the input activation data.

7. An activation device configured to activate a multimedia device having at least a test target function selected from in vehicle media functions, the activation device comprising:
a data acquisition unit configured to acquire vehicle state data simulating a vehicle state when a vehicle is traveling from a plurality of external terminal devices, each of which is provided at a different position from the multimedia device; and
an input unit configured to input, to the multimedia device, activation data corresponding to the vehicle state data such that the multimedia device is activated in response to the vehicle state data.

* * * * *